(12) United States Patent
Zheng et al.

(10) Patent No.: US 11,244,199 B2
(45) Date of Patent: *Feb. 8, 2022

(54) USER IDENTITY DETERMINING METHOD, APPARATUS, AND DEVICE

(71) Applicant: Advanced New Technologies Co., Ltd., Grand Cayman (KY)

(72) Inventors: Dandan Zheng, Beijing (CN); Liang Li, Beijing (CN); Wei Xu, Beijing (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/558,932

(22) Filed: Sep. 3, 2019

(65) Prior Publication Data

US 2020/0074219 A1 Mar. 5, 2020

(30) Foreign Application Priority Data

Sep. 4, 2018 (CN) .......................... 201811025022.8

(51) Int. Cl.
*G06K 9/00* (2006.01)
*G06K 9/62* (2006.01)
(Continued)

(52) U.S. Cl.
CPC ....... *G06K 9/6215* (2013.01); *G06F 16/2264* (2019.01); *G06F 21/32* (2013.01);
(Continued)

(58) Field of Classification Search
None
See application file for complete search history.

(56) References Cited

U.S. PATENT DOCUMENTS

2012/0188055 A1* 7/2012 Sahin ................ G06K 9/00912
340/5.82
2014/0314283 A1 10/2014 Harding
(Continued)

FOREIGN PATENT DOCUMENTS

CN        1801178 A     7/2006
CN     102045162 A     5/2011
(Continued)

OTHER PUBLICATIONS

International Search Report and Written Opinion dated Nov. 27, 2019, in counterpart International Application No. PCT/US2019/048981.

*Primary Examiner* — Feng Niu
(74) *Attorney, Agent, or Firm* — Finnegan, Henderson, Farabow, Garrett & Dunner, LLP

(57) ABSTRACT

A user identity determining method includes: acquiring target multidimensional feature information of a target user, wherein the target multidimensional feature information includes at least two types of feature information in at least one of biometric feature information or non-biometric feature information; comparing the target multidimensional feature information with multidimensional feature information of a plurality of designated users, respectively, to obtain a comparison result; and determining an identity of the target user based on the comparison result.

13 Claims, 12 Drawing Sheets

(51) Int. Cl.
    *G06F 21/32* (2013.01)
    *G06F 16/22* (2019.01)
    *H04L 29/12* (2006.01)

(52) U.S. Cl.
    CPC ..... *G06K 9/00288* (2013.01); *G06K 9/00348* (2013.01); *G06K 9/00369* (2013.01); *G06K 9/00771* (2013.01); *G06K 9/629* (2013.01); *G06K 9/6247* (2013.01); *H04L 61/605* (2013.01); *H04L 61/6022* (2013.01)

(56) References Cited

U.S. PATENT DOCUMENTS

| | | | | |
|---|---|---|---|---|
| 2015/0116086 | A1* | 4/2015 | Kim | G06K 9/00026 340/5.83 |
| 2015/0278977 | A1 | 10/2015 | Roller | |
| 2016/0042253 | A1* | 2/2016 | Sawhney | G06F 16/3322 382/190 |
| 2017/0132458 | A1* | 5/2017 | Short | G06K 9/00255 |
| 2017/0344648 | A1* | 11/2017 | Twyman | G06K 9/00288 |
| 2017/0357878 | A1* | 12/2017 | Sawhney | G06K 9/6215 |
| 2018/0137344 | A1* | 5/2018 | Kusakabe | G06K 9/00281 |
| 2019/0303417 | A1* | 10/2019 | Twyman | H04L 51/32 |
| 2020/0167598 | A1* | 5/2020 | Zheng | G06K 9/00771 |

FOREIGN PATENT DOCUMENTS

| | | |
|---|---|---|
| CN | 102117404 A | 7/2011 |
| CN | 104394118 A | 3/2015 |
| CN | 104639546 A | 5/2015 |
| CN | 105224849 A | 1/2016 |
| CN | 105279416 A | 1/2016 |
| CN | 106096348 A | 11/2016 |
| CN | 107743131 A | 2/2018 |
| CN | 207068000 U | 3/2018 |

* cited by examiner

300

USER IDENTITY DETERMINING METHOD, APPARATUS, AND DEVICE

CROSS-REFERENCE TO RELATED APPLICATIONS

This application is based upon and claims priority to Chinese Patent Application No. 201811025022.8, filed on Sep. 4, 2018, the entire content of all of which is incorporated herein by reference.

TECHNICAL FIELD

The present application relates to the field of computer technologies, and more particularly, to a user identity determining method, apparatus, and device.

TECHNICAL BACKGROUND

Biometric technologies are widely used in the identification of user identities because they are convenient and secure. Biometric technologies include integrating computers with optical sensors, acoustic sensors, biosensors, the principles of biostatistics and other hi-tech means to identify a personal identity using inherent physiological characteristics (such as fingerprint, face, iris, or sound) of the human body.

However, in some cases, existing solutions for using biometric features to identify user identities may have a misidentification problem. For example, when face recognition is used to identify identities of twins, misidentification often occurs. Also for example, when voice recognition is used to identify two users having similar voices, misidentification may also occur.

SUMMARY

Embodiments of the specification provide a user identity determining method, apparatus, and device.

In an embodiment, a user identity determining method includes: acquiring target multidimensional feature information of a target user, wherein the target multidimensional feature information includes at least two types of feature information in at least one of biometric feature information or non-biometric feature information; comparing the target multidimensional feature information with multidimensional feature information of a plurality of designated users, respectively, to obtain a comparison result; and determining an identity of the target user based on the comparison result.

In an embodiment, a user identity determining apparatus includes: an acquiring module configured to acquire target multidimensional feature information of a target user, wherein the target multidimensional feature information includes at least two types of feature information in at least one of biometric feature information or non-biometric feature information; a comparing module configured to compare the target multidimensional feature information with multidimensional feature information of a plurality of designated users, respectively, to obtain a comparison result; and a determining module configured to determine an identity of the target user based on the comparison result.

In an embodiment, a user identity determining device includes: a processor; and a memory configured to store one or more instructions that, wherein the processor is configured to execute the instructions to perform: acquiring target multidimensional feature information of a target user, wherein the target multidimensional feature information includes at least two types of feature information in at least one of biometric feature information or non-biometric feature information; comparing the target multidimensional feature information with multidimensional feature information of a plurality of designated users, respectively, to obtain a comparison result; and determining an identity of the target user based on the comparison result.

In an embodiment, a non-transitory computer-readable storage medium storing one or more instructions that, when executed by a processor of an electronic device, cause the electronic device to perform: acquiring target multidimensional feature information of a target user, wherein the target multidimensional feature information comprises at least two types of feature information in at least one of biometric feature information or non-biometric feature information; comparing the target multidimensional feature information with multidimensional feature information of a plurality of designated users, respectively, to obtain a comparison result, and determining an identity of the target user based on the comparison result.

The technical solutions provided by the embodiments at least have one of the following technical effects: because the identity of the target user is determined based on the multidimensional feature information of the target user, not based on single feature information such as face or voice, user identity misidentification can be reduced, thereby improving reliability of the result of user identity determination.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Embodiments of the specification will be described below with reference to the accompanying drawings. The described embodiments are merely examples, rather than all embodiments consistent with the specification. All other embodiments acquired by those of ordinary skill in the art based on the described embodiments shall fall within the scope of protection of the present application.

The embodiments of the specification provide a user identity determining method and apparatus. The method and apparatus may be applied to a surveillance system requiring user identity identification. For example, nowadays cameras are deployed throughout business districts, and a merchant may wish to use an existing video surveillance network in a business district to identify its consumer based on information acquired by a camera immediately when the consumer appears in the business district, and rapidly search historical consumption data and consumption habits of the consumer, so as to better serve the consumer. For ease of description, the determining of the identity of a user entering a business district is used as an example below to describe the user identity determining method and apparatus provided by the embodiments of the specification.

Figure 1:
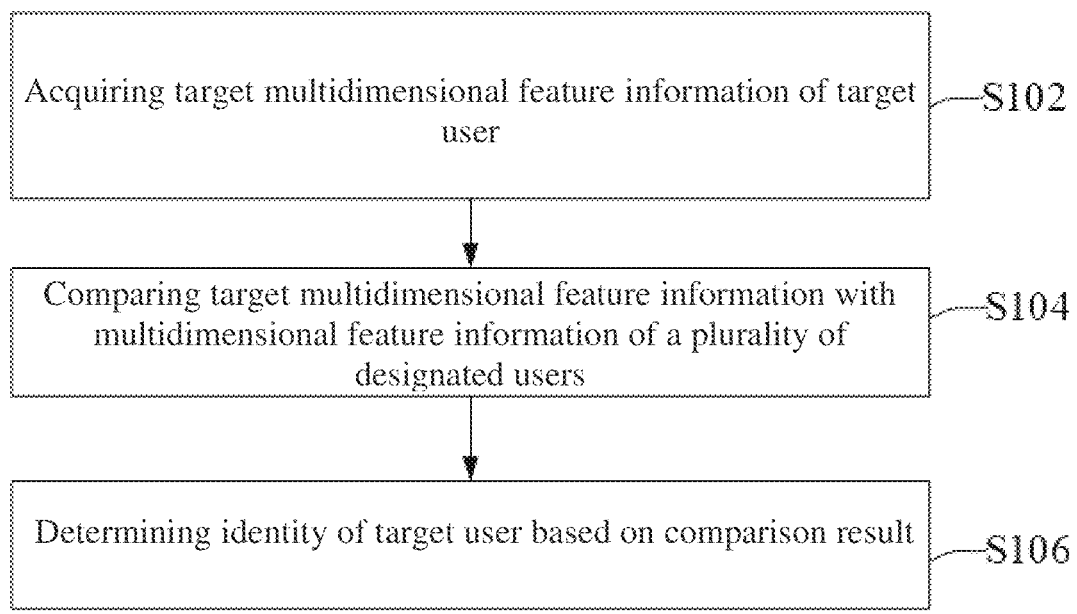
FIG. 1 is a flowchart of a user identity determining method according to an embodiment.

FIG. 1 is a flowchart of a user identity determining method 100 according to an embodiment. Referring to FIG. 1, the user identity determining method 100 includes a step S102 of acquiring target multidimensional feature information of a target user, wherein the target multidimensional feature information includes at least two types of feature information in biometric feature information and/or non-biometric feature information.

The target user may be a user whose identity needs to be determined, identified, or authenticated, for example, a consumer entering a business district (e.g., a shopping mall).

The target multidimensional feature information including at least two types of feature information in biometric feature information and/or non-biometric feature information may refer to that the target multidimensional biometric feature information includes at least two types of feature information in the biometric feature information; or the target multidimensional biometric feature information includes at least two types of feature information in the non-biometric feature information; or the target multidimensional biometric feature information includes at least one type of feature information in the biometric feature information and at least one type of feature information in the non-biometric feature information.

In an embodiment, the biometric feature information may include: face feature information, body feature information, gait feature information, cloth feature information, age feature information, gender feature information, and the like. In an embodiment, the face feature information may include face feature information at multiple poses, for example, face feature information of a frontal face or a 45-degree side face. For example, face feature information at multiple poses may be acquired by using a plurality of cameras. Likewise, the body feature information may also include body feature information at multiple poses, for example, body feature information from the front or a 45-degree side. The gait feature information may include gait feature information in walking and running states.

The non-biometric feature information may include: user identification (ID) information, geographical location information, time information, Wi-Fi address information, and the like. The user ID information may further include information uniquely identifying the user identity, for example, one or more of a user mobile phone number, a user identification number, and user mobile phone media access control (MAC) information. The time information may be information about the time at which the identity of the target user needs to be determined.

When the target multidimensional feature information includes biometric feature information of the target user, at step S102, an image of the target user may be acquired by using an image capture device, for example, by using a camera disposed in the business district, and then the acquired image may be analyzed to obtain the biometric feature information of the target user, such as face feature information, body feature information, gait feature information, cloth feature information, age feature information, and gender feature information.

When the target multidimensional feature information includes non-biometric feature information of the target user, at step S102, ID information, geographical location information, and the like of the target user may be obtained in other manners. For example, mobile phone MAC information of the target user may be detected by using Wi-Fi in the business district, and used as the ID information of the target user; the location information of the target user may be determined according to location information of the business district.

The user identity determining method 100 also includes a step S104 of comparing the target multidimensional feature information with multidimensional feature information of a plurality of designated users, respectively, to obtain a comparison result.

A designated user may be a pre-stored user whose identity is known, for example, a membership consumer pre-stored in a user identity surveillance system of a business district.

By comparing the acquired target multidimensional feature information of the target user with the multidimensional feature information of the plurality of designated users whose identities are known, similarity values of the target user with respect to the plurality of designated users may be respectively determined, and the determined similarity values are used as the comparison result in determining the identity of the target user.

In an example, a weighted sum of similarity values corresponding to various feature information in the multidimensional feature information may be used as a similarity value of the target user with respect to a designated user. For example, assuming that four pieces of feature information A, B, C, and D of the target user are respectively compared with four pieces of feature information A, B, C, and D of the designated user, and four similarity values a, b, c, and d may be correspondingly obtained. In this case, a weighted sum of the similarity values a, b, c, and d may be used as the similarity value of the target user with respect to the designated user. Weights corresponding to different feature information may be determined according to the degree of importance of the feature information.

In an embodiment, a first database storing a correspondence between user ID information of a designated user and multidimensional feature information of the designated user may be built in advance, so that during comparison, the target multidimensional feature information of the target user is compared with the multidimensional feature information of the designated user in the first database built in advance, to obtain the comparison result.

The process of building the first database is described below with reference to FIG. 2 to FIG. 4.

Figure 2:
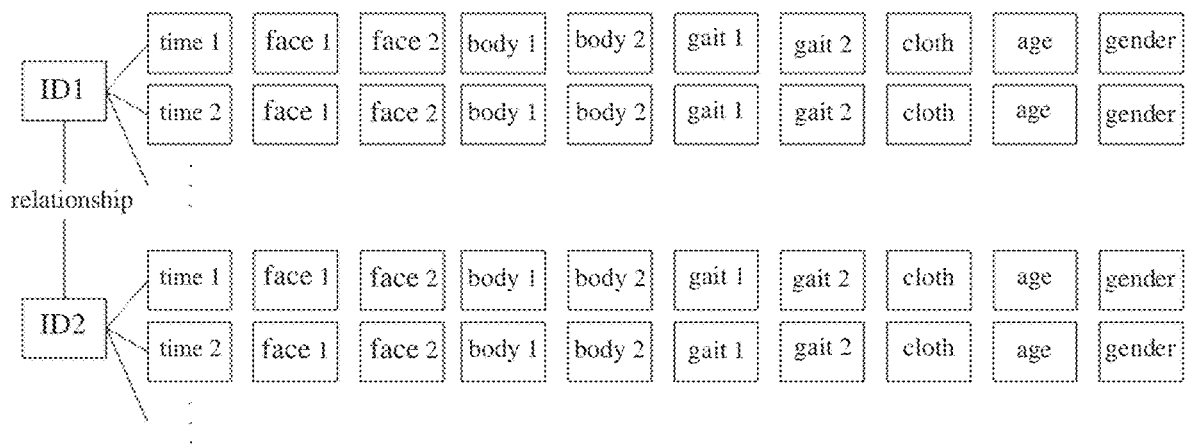
FIG. 2 is a schematic diagram of building a first database according to an embodiment.

FIG. 2 is a schematic diagram of building a first database 200 according to an embodiment. Referring to FIG. 2, multidimensional feature information of a designated user includes biometric feature information that includes: face feature information, body feature information, gait feature information, cloth feature information, age feature information, and gender feature information.

Figure 3:
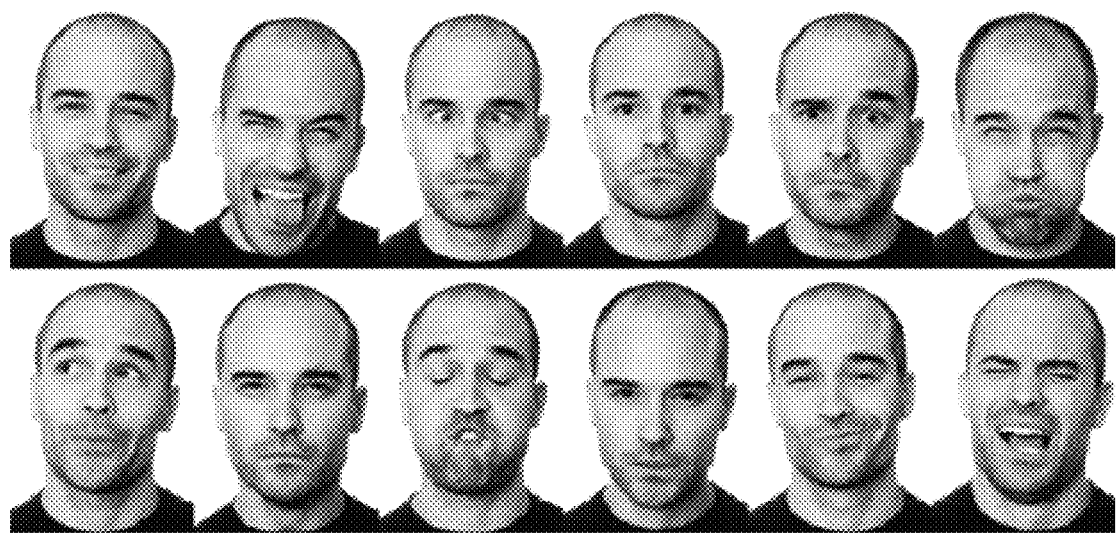
FIG. 3 is a schematic diagram of face feature data at multiple poses according to an embodiment.

FIG. 3 is a schematic diagram of face feature data 300 at multiple poses according to an embodiment. Referring to FIG. 3, the face feature data 300 include face feature information for different facial expressions and different poses.

Figure 4:
FIG. 4 is a schematic diagram of gait feature data according to an embodiment.

FIG. 4 is a schematic diagram of gait feature data 400 according to an embodiment. Referring to FIG. 4, the gait feature data 400 include gait feature information in walking and running states.

Referring back to FIG. 2, for a designated user 1 (corresponding to user ID1), biometric feature information such as face 1, face 2, body 1, body 2, gait 1, gait 2, age, and gender may be acquired from a surveillance video captured by a camera, and stored in the first database. Likewise, for a designated user 2 (corresponding to user ID2), biometric feature information such as face 1, face 2, body 1, body 2, gait 1, gait 2, age, and gender may be acquired from a surveillance video captured by a camera, and stored in the first database.

In an embodiment, because the biometric feature information of the user may change with time or seasons, the biometric feature information of the designated user 1 and the designated user 2 at different time points (time point 1 and time point 2 in FIG. 2) may be recorded and saved. In an embodiment, the first database may further record and save spatial dimensional features of the designated user including feature information such as face, body, and gait of the designated user captured by different cameras at different angles.

In an embodiment, as shown in FIG. 2, a relationship between users may be pre-determined, and the relationship may also be stored in the first database.

In an embodiment, non-biometric feature information of the designated user and the ID information of the designated user may also be stored in the first database.

Referring back to FIG. 1, the user identity determining method 100 also includes a step S106 of determining an identity of the target user based on the comparison result.

In an embodiment, the comparison result in step S104 is the similarity values of the target user with respect to the plurality of designated users. Accordingly, at step S106, an identity of a designated user in the plurality of designated users that has the largest similarity value, which is greater than a preset threshold, with respect to the target user may be determined as the identity of the target user. In an embodiment, if the plurality of designated users do not include a designated user whose degree of similarity to the target user is greater than the preset threshold, the target user may be determined as a new user or a non-membership user. The preset threshold may be manually set. For example, the preset threshold may be 80%.

In the user identity determining method provided by the embodiments, because the identity of the target user is determined based on the multidimensional feature information of the target user, not based on single feature information such as face or voice, user identity misidentification may be reduced, thereby improving reliability of the result of user identity determination.

Figure 5:
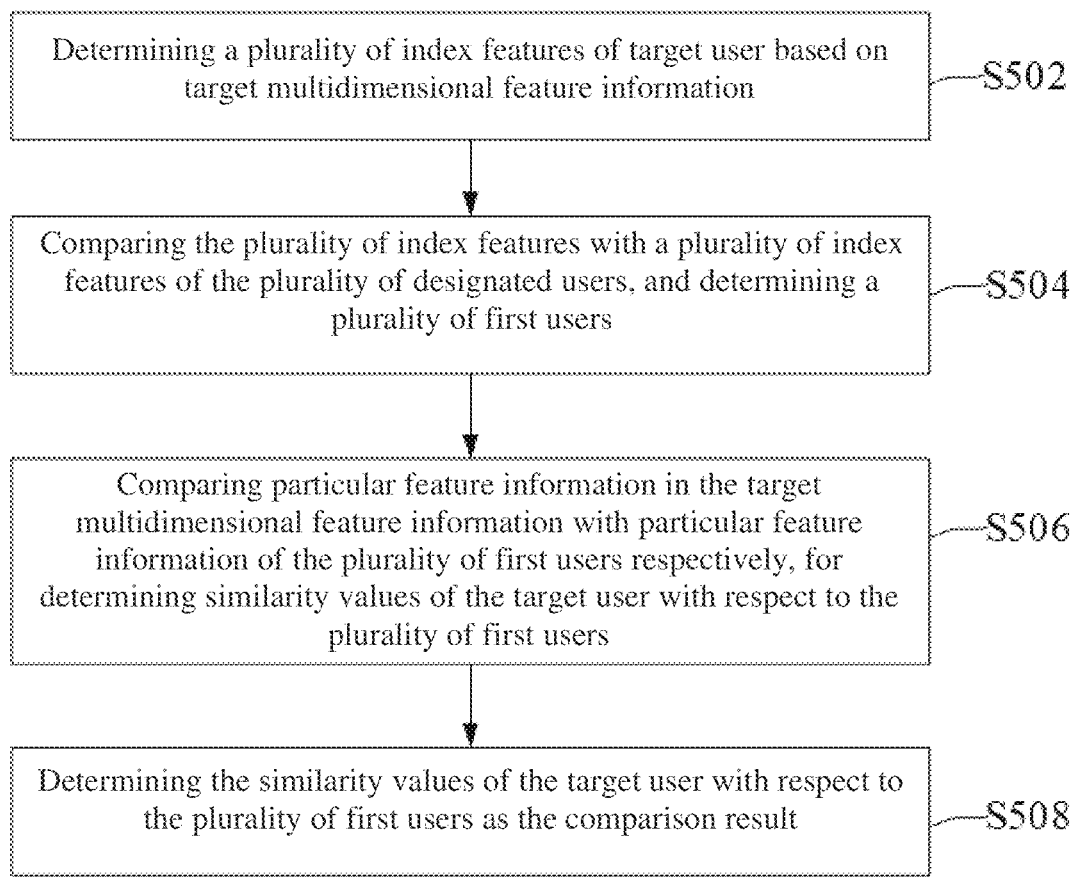
FIG. 5 is a flowchart of a user identity determining method according to an embodiment.

FIG. 5 is a flowchart of a user identity determining method 500 according to an embodiment. Referring to FIG. 5, the method 500 may be used to implement the step S104 in FIG. 1.

The method 500 includes a step S502 of determining a plurality of index features of the target user based on the target multidimensional feature information.

An index feature may be a feature uniquely identifying original feature information (for example, the feature information acquired in step S102 of FIG. 1) and having a data amount less than that of the original feature information.

The plurality of index features may include: a single index feature for the same type of feature information, a composite index feature for at least two types of feature information occurring at the same time, or a composite index feature for feature information of different users occurring at the same time.

The single index feature may be an index feature determined by one type of feature information. The composite index feature may be an index feature determined by two or more types of feature information.

For example, the single index feature for the same type of feature information may be a geographical location index feature for the geographical location information, a face index feature for face feature information at a particular angle, or the like. For example, the composite index feature for at least two types of feature information occurring at the same time may be a composite index feature formed by an obvious body feature and an obvious cloth feature. For example, the composite index feature for feature information of different users occurring at the same time may be a composite index feature formed by faces of a couple shopping at the same time in a shopping mall.

The process of determining a plurality of index features of the target user is described below by using examples.

In a first example, assuming that the target multidimensional information of the target user includes geographical location information of the target user, step S502 may include: determining a level 1 geographical location index feature of the target user based on the geographical location information of the target user; or, determining a level 1 geographical location index feature and a level 2 geographical location index feature of the target user based on the geographical location information of the target user; or, determining a level 1 geographical location index feature, a level 2 geographical location index feature, and a level 3 geographical location index feature of the target user based on the geographical location information of the target user. The level 3 geographical location index feature is a subindex of the level 2 geographical location index, and the level 2 geographical location index is a subindex of the level 1 geographical location index.

For example, an area with a fixed flow of people, such as a shopping mall, mansion, office building, or a community, may be determined as the level 1 geographical location index feature; a floor or store in the shopping mall, a floor or room in the mansion, or a unit or floor of the community may be determined as the level 2 geographical location index feature; and a location of a camera in the store in the shopping mall may be determined as the level 3 geographical location index feature.

In a second example, assuming that the target multidimensional feature information includes the biometric feature information of the target user, for example, face feature information, body feature information, and cloth feature information, step S502 may include: performing a Principal Component Analysis (PCA) on the biometric feature information of the target user to obtain reduced-dimensionality features of the biometric feature information; bucketizing the reduced-dimensionality features in a plurality of buckets representing the biometric feature information; and determining IDs of the plurality of buckets as the plurality of index features of the target user. For example, a gait bucket index feature, a cloth bucket index feature, a gender bucket index feature, a face bucket index feature, an age bucket index feature, a body bucket index feature, and the like are obtained. A bucket ID may be a serial number such as 1, 2, 3, or 4.

In an embodiment, the target multidimensional feature information includes ID information and time information of the target user, a time index feature (or referred to as timestamp) and an ID index feature may further be determined based on step S502. Based on the target multidimensional feature information, a relation-face-character composite index feature, a face-body composite index feature, and the like are determined.

The method 500 also includes a step S504 of comparing the plurality of index features with a plurality of index features of the plurality of designated users, respectively, and determining a plurality of first users from the plurality of designated users.

In an embodiment, a second database storing a correspondence between user ID information of each designated user and a plurality of index features of the designated user may be built in advance, so that during comparison, the plurality of index features of the target user may be compared with the plurality of index features of the designated user in the second database, to obtain a plurality of first users. The plurality of index features of the designated user may be determined in a manner similar to that in which the plurality of index features of the target user is determined, and the details will not be repeated here.

For example, the determined index features stored in the second database may include: a gait bucket index feature, a cloth bucket index feature, a gender bucket index feature, a face bucket index feature, an age bucket index feature, a body bucket index feature, a time index feature (or a timestamp), an ID index feature, a relational-face-character composite index feature, a face-body composite index feature, and the like.

The first database and the second database may be the same database or may be different databases.

In an embodiment, in step S504, the plurality of index features of the target user may be respectively compared with the index features of the plurality of designated users, to determine, from the plurality of designated users, users having one or more of the plurality of index features matching corresponding index features of the target user as the plurality of first users. The index features matching each other may be the index features that are the same or similar. For example, assuming that the plurality of index features of the target user include a geographical location index feature and a face index feature, the plurality of first users may be a plurality of designated users whose geographical location index features and face index features are the same as the geographical location index feature and the face index feature of the target user.

In an embodiment, in step S504, the plurality of index features of the target user may be sorted according to a certain rule, for example, sorted at random or according to the degree of accuracy of user identity identification. Afterward, a plurality of users matching the index feature ranked the first are determined from the plurality of designated users and then, from the plurality of users, a plurality of users matching the index feature ranked the second are determined, and so on. In this way, a plurality of users matching an index feature is determined from a determining result obtained according to the matching of an index feature ranked before that index feature. Finally, a plurality of users matching the index feature ranked the last is used as the plurality of first users. The process of determining the plurality of first users in the manner shown in the example is described below with reference to FIG. 6 and FIG. 7.

Figure 6:
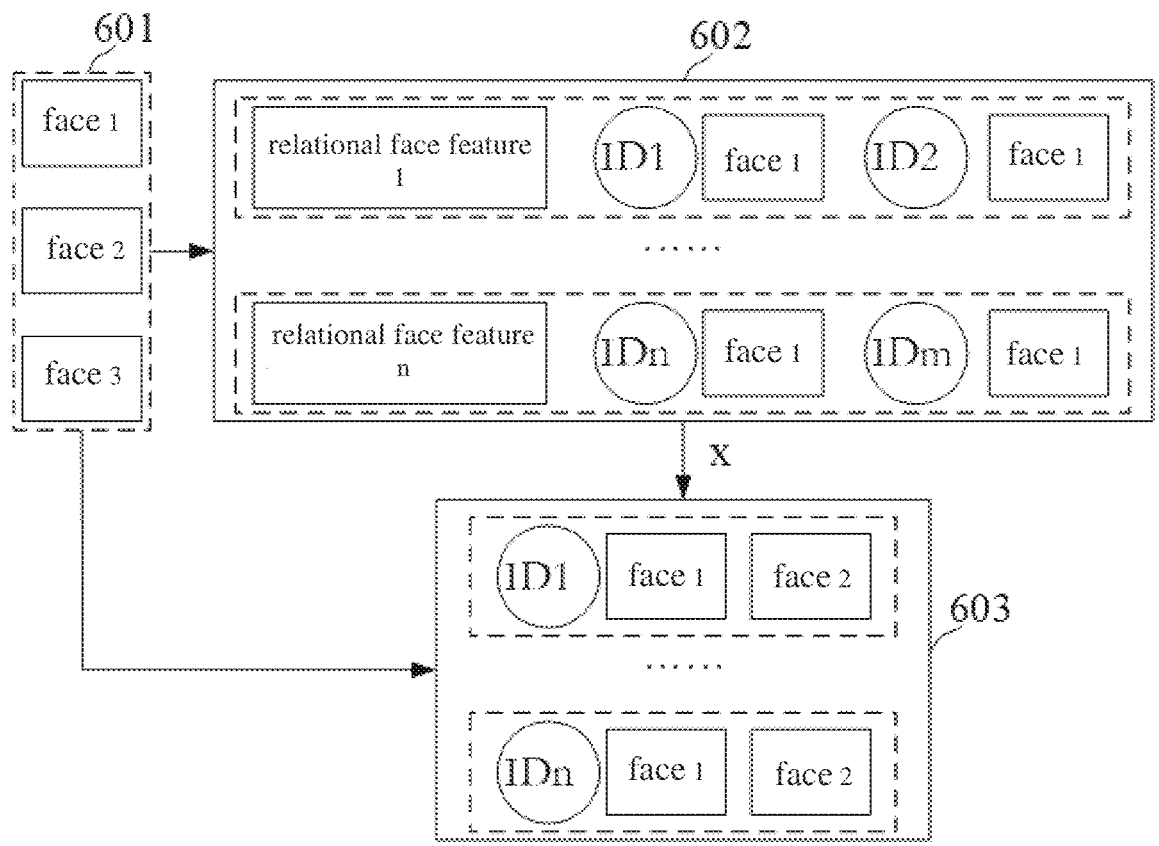
FIG. 6 is a schematic diagram of an index feature comparison process according to an embodiment.

FIG. 6 is a schematic diagram of an index feature comparison process 600 according to an embodiment. Referring to FIG. 6, in the index feature comparison process 600, first, multidimensional feature information 601 including face 1, face 2, and face 3 of the target user is acquired. For example, three pieces of feature information "face 1, face 2, and face 3" of the target user may be acquired by using a plurality of cameras at different angles at a time at which the identity of the target user needs to be determined. Second, based on the acquired multidimensional feature information of the target user, a plurality of index features of the target user are determined. Then, the plurality of index features of the target user are compared with corresponding index features of a plurality of designated users stored in a second database 602, to determine x first users. For example, the corresponding index features of a plurality of designated users stored in the second database 602 may include composite index features that further include a plurality of relational face features (relational face feature 1 to relational face feature n) and single index features that further include a plurality of face features (face 1). Finally, in a manner shown in step S506 (FIG. 5) as described below, the three pieces of feature information "face 1, face 2, and face 3" are used as particular feature information of the target user and compared with particular feature information of the x first users 603, and similarity values of the target user with respect to the x first users are determined.

Figure 7:
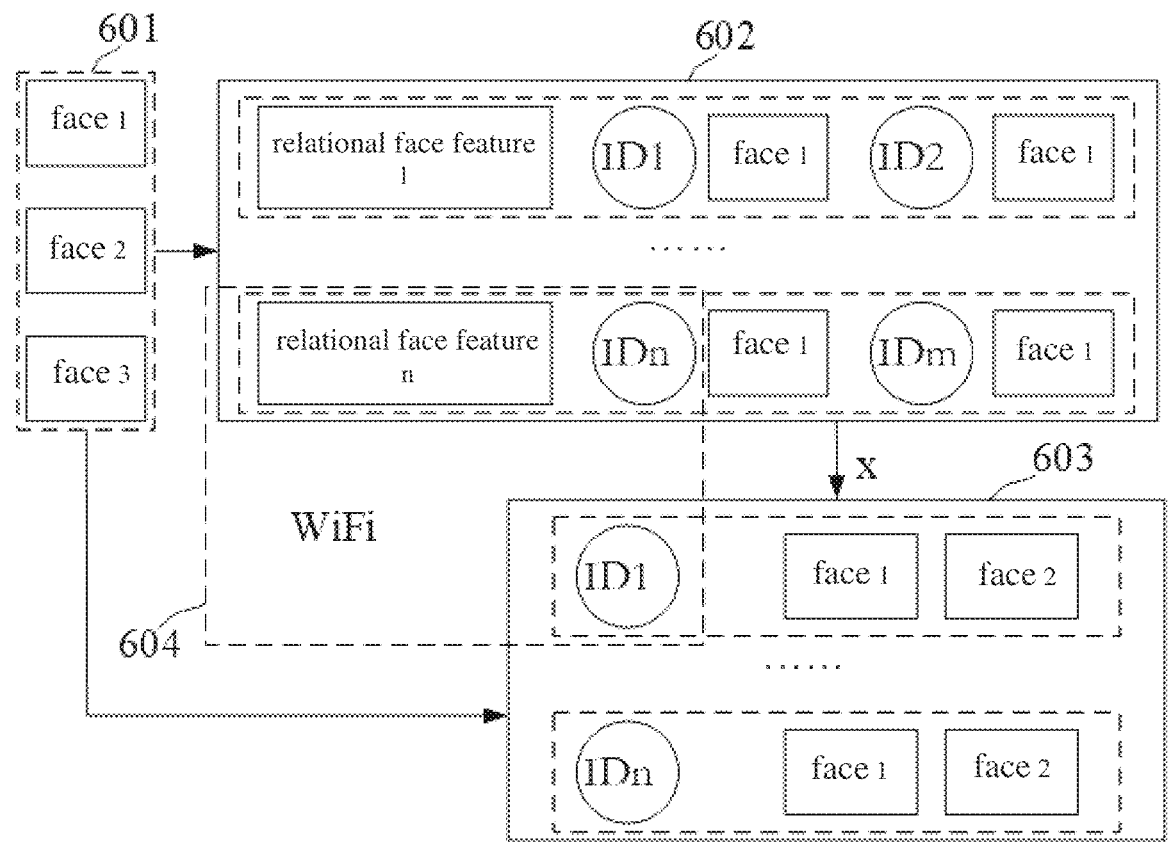
FIG. 7 is a schematic diagram of an index feature comparison process according to an embodiment.

FIG. 7 is a schematic diagram of an index feature comparison process 700 according to an embodiment. Referring to FIG. 7, in the index feature comparison process 700, first, multidimensional feature information 601 including face 1, face 2, and face 3 of the target user is acquired. For example, three pieces of feature information "face 1, face 2, and face 3" of the target user may be acquired by using a plurality of cameras at different angles at a time at which the identity of the target user needs to be determined. Second, based on the acquired multidimensional feature information of the target user, a plurality of index features of the target user are determined. Then, the plurality of index features of the target user are compared with corresponding index features of a plurality of designated users stored in a second database 602, to determine x first users. For example, the corresponding index features of the plurality of designated users stored in the second database 602 may include composite index features that further include a plurality of relational face features (relational face feature 1 to relational face feature n), single index features that further include a plurality of face features (face 1), and a Wi-Fi address 604. Finally, in a manner shown in step S506 (FIG. 5) as described below, the three pieces of feature information "face 1, face 2, and face 3" are used as particular feature information of the target user and compared with particular feature information of the x first users 603, and similarity values of the target user with respect to the x first users are determined.

Referring back to FIG. 5, the method 500 also includes a step S506 of comparing particular feature information in the target multidimensional feature information with particular feature information of the plurality of first users, respectively, and determining similarity values of the target user with respect to the plurality of first users.

In step S506, based on the plurality of first users determined in step S504, the particular feature information in the target multidimensional feature information and the particular feature information of the plurality of first users are further compared, for determining the similarity values of the target user with respect to the plurality of first users, respectively.

The particular feature information may be biometric feature information of the target user, for example, face feature information, body feature information, cloth feature information, or the like.

The method 500 also includes a step S508 of determining the similarity values of the target user with respect to the plurality of first users as the comparison result.

Based on the method 500, the step 106 (FIG. 1) may include: determining an identity of a user corresponding to the largest similarity value which is greater than a preset threshold in the comparison result as the identity of the target user. For example, in the plurality of first users, an identity of a user that has the largest similarity value, which is greater than the preset threshold, with respect to the target user is determined as the identity of the target user.

In the embodiment shown in FIG. 5, because index features having a small amount of data are compared first, a plurality of candidate users (for example, a plurality of first users) that may be similar to the target user are determined from the plurality of designated users so as to reduce the range to be compared, and then in the small range, the identity of the target user is determined through comparison of the particular feature information, thereby improving efficiency of determining the identity of the target user.

Figure 8:
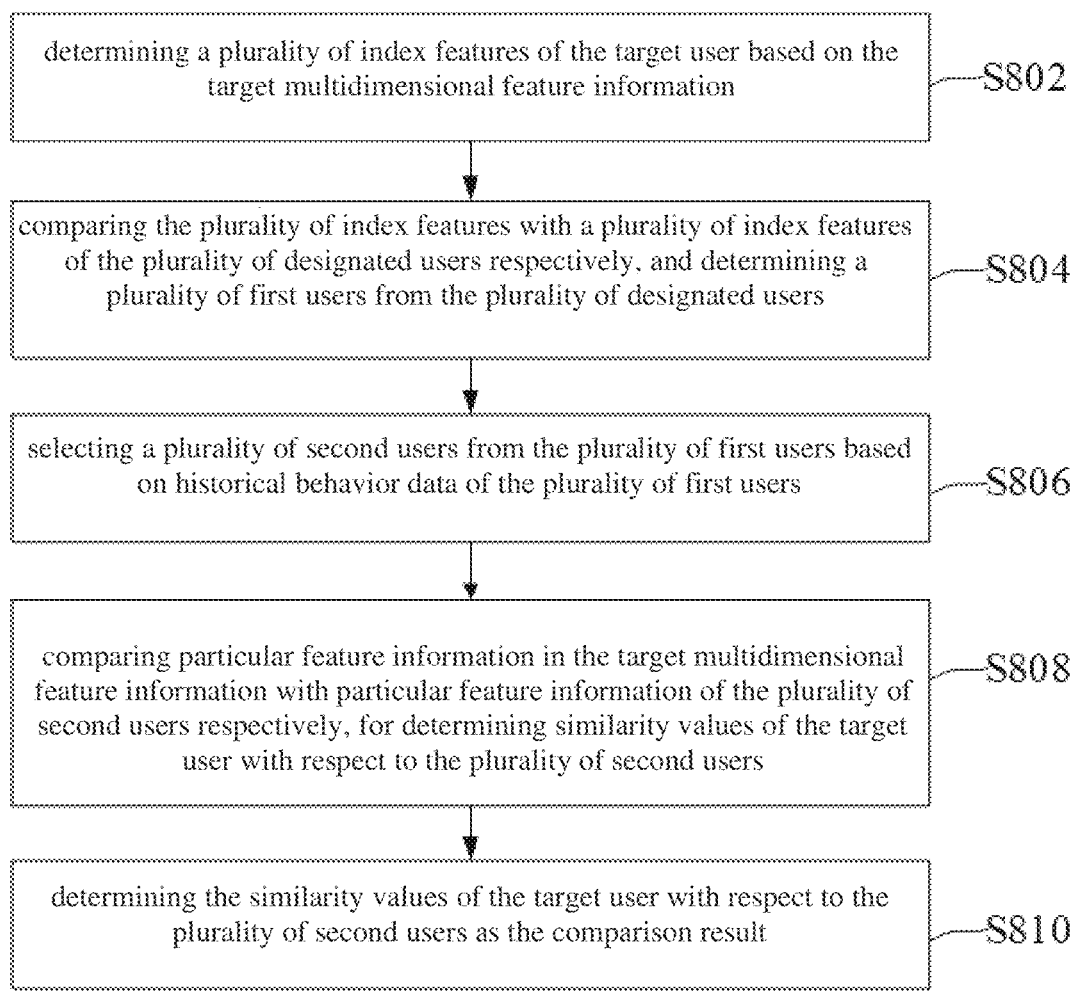
FIG. 8 is a flowchart of a user identity determining method according to an embodiment.

FIG. 8 is a flowchart of a user identity determining method 800 according to an embodiment. Referring to FIG. 8, the method 800 may be used to implement the step 104 in FIG. 1.

The method 800 includes a step S802 of determining a plurality of index features of the target user based on the target multidimensional feature information.

The method 800 also includes a step S804 of comparing the plurality of index features with a plurality of index features of the plurality of designated users, respectively, and determining a plurality of first users from the plurality of designated users.

Specific implementations of the step S802 and the step S804 may be the same as the step S502 and the step S504, respectively, in the embodiment shown in FIG. 5, so the details will not be repeated herein.

The method 800 also includes a step S806 of selecting a plurality of second users from the plurality of first users based on historical behavior data of the plurality of first users.

In an example, the plurality of first users may be sorted based on historical behavior data of the plurality of first users, and then a plurality of second users whose rankings satisfy a preset condition is selected from the plurality of first users.

When the determining of an identity of a user entering a business district is used as an example, the historical behavior data may be a quantity of historical consumptions, a quantity of historical entry times, or a historical consumption amount; correspondingly, when the plurality of first users is sorted, the first users may be sorted in a descending order of the quantity of historical consumptions, the quantity of historical entry times, or the historical consumption amount.

In another example, the plurality of first users may be sorted based on a preset sorting model, and then a plurality of second users whose rankings satisfy a preset condition is selected from the plurality of first users. The preset sorting model may be a sorting model in the prior art.

The step of selecting a plurality of second users whose rankings satisfy a preset condition from the plurality of first users may include selecting one or more top-ranked users from the plurality of first users as the plurality of second users.

The method 800 also includes a step S808 of comparing particular feature information in the target multidimensional feature information with particular feature information of the plurality of second users, respectively, for determining similarity values of the target user with respect to the plurality of second users.

The method 800 includes a step S810 of determining the similarity values of the target user with respect to the plurality of second users as the comparison result.

Specific implementations of the step S808 and the step S810 may be the same as the step 506 and the step 508, respectively, in the embodiment shown in FIG. 5, so the details will not be repeated herein.

Based on the embodiment shown in FIG. 8, the step 106 (FIG. 1) may include: determining an identity of a user corresponding to the largest similarity value which is greater than a preset threshold in the comparison result as the identity of the target user. For example, in the plurality of second users, an identity of a user that has the largest similarity value, which is greater than the preset threshold, with respect to the target user is determined as the identity of the target user.

Compared with the embodiment shown in FIG. 5, in the embodiment shown in FIG. 8, index features having a small amount of data are compared first and a plurality of candidate users (for example, a plurality of first users) that may be similar to the target user are determined from the plurality of designated users so as to reduce the range to be compared. Moreover, a plurality of second users is further selected from the plurality of first users to further reduce the range to be compared; then in the further reduced range, the identity of the target user is determined through comparison of the particular feature information. In this way, efficiency of determining the identity of the target user can be further improved.

Figure 9:
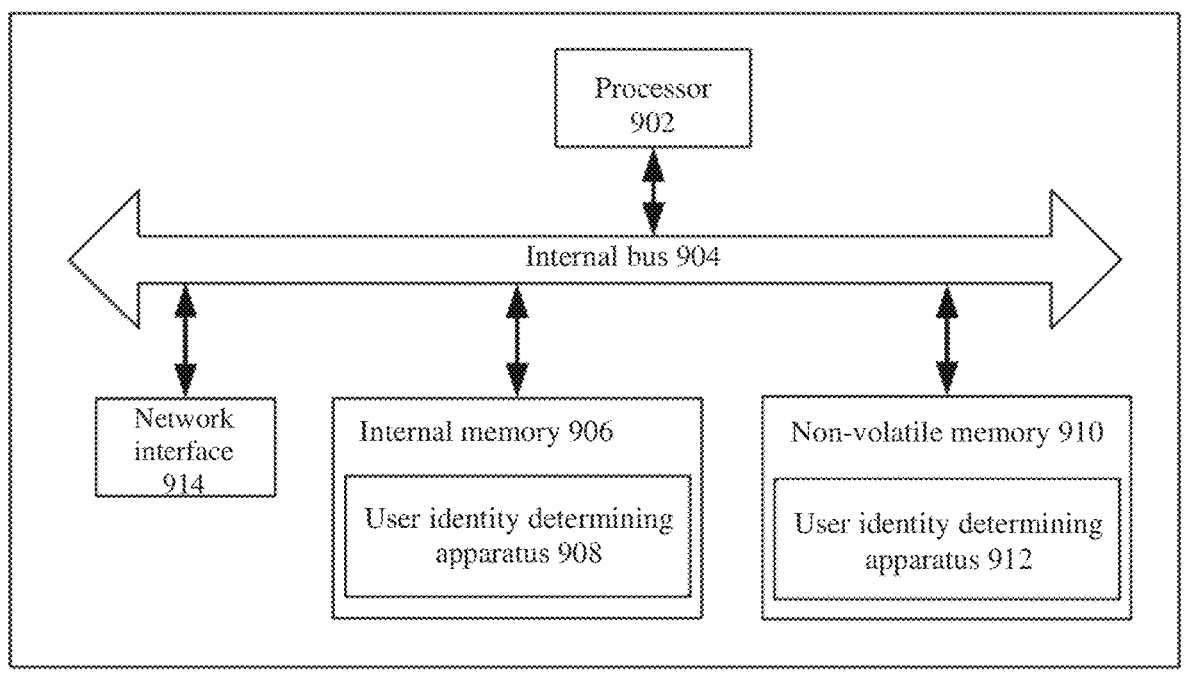
FIG. 9 is a schematic diagram of a user identity determining device according to an embodiment.

FIG. 9 is a schematic diagram of a device 900 according to an embodiment. Referring to FIG. 9, the device 900 includes a processor 902, an internal bus 904, a network interface 914, an internal memory 906 (e.g., a high-speed Random Access Memory (RAM)), and a non-volatile memory 910 (e.g., a magnetic disk memory). The device 900 may further include other hardware components as required by services.

The processor 902, the network interface 914, the internal memory 906, and the non-volatile memory 910 may be connected to each other through the internal bus 904. The internal bus 904 may be an Industry Standard Architecture (ISA) bus, a Peripheral Component Interconnect (PCI) bus, an Extended Industry Standard Architecture (EISA) bus, or the like. The internal bus 904 may include an address bus, a data bus, a control bus, or the like (not shown). In FIG. 9, only one bidirectional arrow is used to illustrate the bus, but it does not represent that there is only one bus or only one type of buses.

The internal memory 906 and/or the non-volatile memory 910 may be configured to store a program. For example, the program may include program codes, and the program codes may include computer operation instructions. The internal memory 906 and the non-volatile memory 910 may provide instructions and data for the processor 902.

The processor 902 may read a corresponding computer program from the non-volatile memory 910 into the internal memory 906 and then run the program, to form user identity determining apparatuses 908 and 912 at the logical level.

The processor 902 may execute the program stored in the internal memory 906 and/or the non-volatile memory 910, and may be configured to perform the following operations: acquiring target multidimensional feature information of a target user, wherein the target multidimensional feature information includes at least two types of feature information in biometric feature information and/or non-biometric feature information; comparing the target multidimensional feature information with multidimensional feature information of a plurality of designated users, respectively, to obtain a comparison result, and determining an identity of the target user based on the comparison result.

The user identity determining method disclosed in the embodiment shown in FIG. 1 may be implemented by the processor 902. The processor 902 may be an integrated circuit chip having a signal processing capability. In an implementation process, the steps of the foregoing method may be completed by hardware integrated logic circuits in the processor 902 or software-form instructions. The processor 902 may be a general-purpose processor including a Central Processing Unit (CPU), a Network Processor (NP), or the like, and may also be a Digital Signal Processor (DSP), an Application Specific Integrated Circuit (ASIC), a Field-Programmable Gate Array (FPGA) or another programmable logic device, a discrete gate, a transistor logic device, or a discrete hardware component. The processor 902 may implement or execute various methods, steps and logic block diagrams disclosed in one or more embodiments of the specification. The general-purpose processor may be a microprocessor, or any regular processor or the like. Steps of the methods disclosed in combination with one or more embodiments of the specification may be directly embodied as being executed by a hardware decoding processor or executed by a combination of hardware in the decoding processor and software modules. The software modules may be located in a storage medium, such as a random access memory, a flash memory, a read-only memory, a programmable read-only memory, an electrically erasable programmable read-only memory, or a register. The storage medium may be located in the internal memory 906 and/or the non-volatile memory 910. The processor 902 may read information in the internal memory 906 and the non-volatile memory 910, and complete the steps of the methods.

The device 900 may perform the user identity determining method of FIG. 1, and the details will not be repeated herein.

In addition to the software implementation, the device 900 does not exclude other implementations, such as a logic device, or a combination of hardware and software. In other words, entities executing the processing procedure are not limited to logic units, but may also be hardware or logic devices.

The embodiments of the specification further provide a computer-readable storage medium. The computer-readable storage medium may store one or more programs. The one or more programs may include one or more instructions. The instructions, when executed by a processor of an electronic device, may cause the electronic device to perform the above described methods, for example, perform the following operations: acquiring target multidimensional feature information of a target user, wherein the target multidimensional feature information includes at least two types of feature information in biometric feature information and/or non-biometric feature information; comparing the target multidimensional feature information with multidimensional feature information of a plurality of designated users, respectively, to obtain a comparison result; and determining an identity of the target user based on the comparison result.

Figure 10:
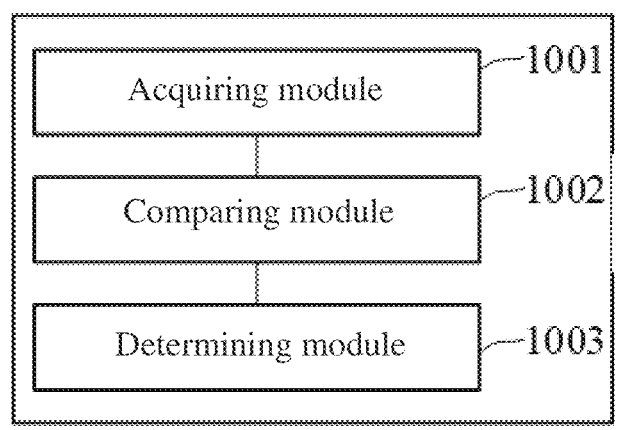
FIG. 10 is a schematic diagram of a user identity determining apparatus according to an embodiment.

FIG. 10 is a schematic diagram of a user identity determining apparatus 1000 according an embodiment. Referring to FIG. 10, the user identity determining apparatus 1000 includes an acquiring module 1001, a comparing module 1002, and a determining module 1003.

The acquiring module 1001 may be configured to acquire target multidimensional feature information of a target user, wherein the target multidimensional feature information may include at least two types of feature information in biometric feature information and/or non-biometric feature information.

The biometric feature information may include: face feature information, body feature information, gait feature information, cloth feature information, age feature information, and gender feature information. The non-biometric feature information may include user ID information, geographical location information, and time information, wherein the user ID information may include one or more of a user mobile phone number, a user identity number, and user mobile phone MAC information.

The comparing module 1002 may be configured to compare the target multidimensional feature information with multidimensional feature information of a plurality of designated users, respectively, to obtain a comparison result.

In an embodiment, the comparing module 1002 may be configured to: compare the target multidimensional feature information with the multidimensional feature information of the plurality of designated users, respectively, to obtain similarity values of the target user with respect to the plurality of designated users; and determine the similarity values of the target user with respect to the plurality of designated users as the comparison result.

The determining module 1003 may be configured to determine an identity of the target user based on the comparison result.

In an embodiment, in the user identity determining apparatus 1000, the identity of the target user is determined based on the multidimensional feature information of the target user, not based on single feature information such as face or voice, user identity misidentification can be reduced, thereby improving reliability of the result of user identity determination.

Figure 11:
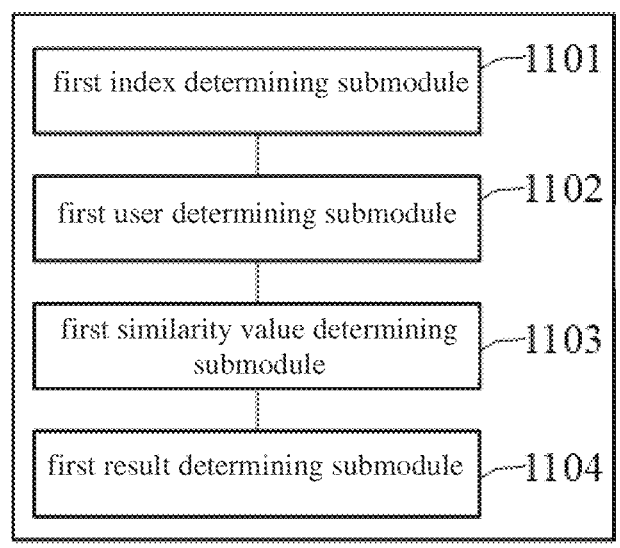
FIG. 11 is a schematic diagram of a comparing module according to an embodiment.

FIG. 11 is a schematic diagram of a comparing module 1100 according to an embodiment. For example, the comparing module 1100 may the comparing module 1002 (FIG. 10). Referring to FIG. 11, the comparing module 1100 may include: a first index determining submodule 1101, a first user determining submodule 1102, a first similarity value determining submodule 1103, and a first result determining submodule 1104.

The first index determining submodule 1101 may be configured to determine a plurality of index features of the target user based on the target multidimensional feature information.

The plurality of index features may include: a single index feature for the same type of feature information, a composite index feature for at least two types of feature information occurring at the same time, and a composite index feature for feature information of different users occurring at the same time.

In an embodiment, the target multidimensional feature information includes geographical location information of the target user, and the determining a plurality of index features of the target user based on the target multidimensional feature information may include: determining a level 1 geographical location index feature of the target user based on the geographical location information of the target user;

or, determining a level 1 geographical location index feature and a level 2 geographical location index feature of the target user based on the geographical location information of the target user; or, determining a level 1 geographical location index feature, a level 2 geographical location index feature, and a level 3 geographical location index feature of the target user based on the geographical location information of the target user. The level 3 geographical location index feature is a subindex of the level 2 geographical location index, and the level 2 geographical location index is a subindex of the level 1 geographical location index.

In an embodiment, the target multidimensional feature information includes biometric feature information of the target user, and the determining a plurality of index features of the target user based on the target multidimensional feature information may include: performing a principal component analysis (PCA) on the biometric feature information of the target user to obtain reduced-dimensionality features of the biometric feature information; bucketizing the reduced-dimensionality features in a plurality of buckets representing the biometric feature information; and determining IDs of the plurality of buckets as the plurality of index features of the target user.

The first user determining submodule 1102 may be configured to compare the plurality of index features with a plurality of index features of the plurality of designated users, respectively, and determine a plurality of first users from the plurality of designated users.

In an embodiment, the first user determining submodule 1102 may compare the plurality of index features of the target user with the index features of the plurality of designated users, respectively, to determine, from the plurality of designated users, users having one or more of the plurality of index features matching corresponding index features of the target user as the plurality of first users. The index features matching each other may be the index features that are the same or similar.

In an embodiment, the first user determining submodule 1102 may first sort the plurality of index features of the target user according to a certain rule, for example, at random or according to the degree of accuracy of user identity identification; afterward, determine a plurality of users matching the index feature ranked the first from the plurality of designated users, and then determine a plurality of users matching the index feature ranked the second from the plurality of users, and so on. In this way, a plurality of users matching one index feature is determined from a determining result obtained according to the matching of an index feature ranked before the index feature. Finally, a plurality of users matching the index feature ranked the last is used as the plurality of first users.

The first similarity value determining submodule 1103 may be configured to compare particular feature information in the target multidimensional feature information with particular feature information of the plurality of first users, respectively, and determine similarity values of the target user with respect to the plurality of first users.

In an embodiment, based on the plurality of first users determined by the first user determining submodule 1102, the first similarity value determining submodule 1103 may further compare particular feature information and determine the similarity values of the target user with respect to the plurality of first users, respectively.

The particular feature information may be biometric feature information of the target user, for example, face feature information, body feature information, cloth feature information, or the like.

The first result determining submodule 1104 may be configured to determine the similarity values of the target user with respect to the plurality of first users as the comparison result.

Based on the apparatus 1100, the determining module 1003 (FIG. 10) may be configured to determine an identity of a user corresponding to the largest similarity value which is greater than a preset threshold in the comparison result as the identity of the target user. For example, in the plurality of first users, an identity of a user that has the largest similarity value, which is greater than the preset threshold, with respect to the target user is determined as the identity of the target user.

In the embodiment shown in FIG. 11, because index features having a small amount of data are compared first, a plurality of candidate users (for example, a plurality of first users) that may be similar to the target user are determined from the plurality of designated users so as to reduce the range to be compared, and then in the small range, the identity of the target user is determined through comparison of the particular feature information, thereby improving efficiency of determining the identity of the target user.

Figure 12:
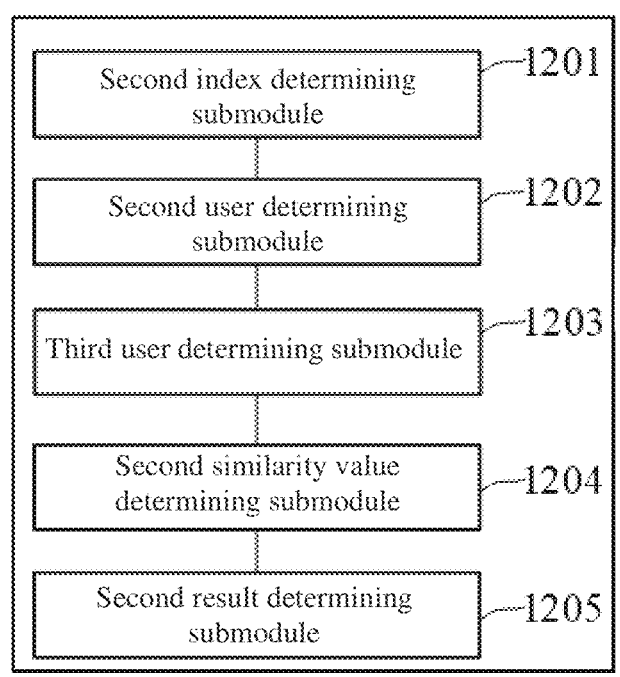
FIG. 12 is a schematic diagram of a comparing module according to an embodiment.

FIG. 12 is a schematic diagram of a comparing module 1200 according to an embodiment. For example, the comparing module 1200 may be the comparing module 1002 (FIG. 10). Referring to FIG. 12, the comparing module 1200 includes: a second index determining submodule 1201, a second user determining submodule 1202, a third user determining submodule 1203, a second similarity value determining submodule 1204, and a second result determining submodule 1205.

The second index determining submodule 1201 may be configured to determine a plurality of index features of the target user based on the target multidimensional feature information.

The second user determining submodule 1202 may be configured to compare the plurality of index features with a plurality of index features of the plurality of designated users, respectively, and determine a plurality of first users from the plurality of designated users.

Specific implementations of the second index determining submodule 1201 and the second user determining submodule 1202 may be the same as those of the first index determining submodule 1101 and the first user determining submodule 1102 in FIG. 11, respectively, so the details will not be repeated herein.

The third user determining submodule 1203 may be configured to select a plurality of second users from the plurality of first users based on historical behavior data of the plurality of first users.

In an embodiment, the third user determining submodule 1203 may first sort the plurality of first users based on historical behavior data of the plurality of first users, and then a plurality of second users whose rankings satisfy a preset condition are selected from the plurality of first users.

In an embodiment, the third user determining submodule 1203 may sort the plurality of first users based on a preset sorting model, and then select a plurality of second users whose rankings satisfy a preset condition from the plurality of first users. The preset sorting model may be a known sorting model.

The third user determining submodule 1203 selecting a plurality of second users whose rankings satisfy a preset condition from the plurality of first users may include: selecting the top-ranked several users from the plurality of first users as the plurality of second users.

The second similarity value determining submodule 1204 may be configured to compare particular feature information in the target multidimensional feature information with particular feature information of the plurality of second users, respectively, and determine similarity values of the target user with respect to the plurality of second users.

The second result determining submodule 1205 may be configured to determine the similarity values of the target user with respect to the plurality of second users as the comparison result.

Specific implementations of the second similarity value determining submodule 1204 and the second result determining submodule 1205 may be similar to those of the first similarity value determining submodule 1103 and the first result determining submodule 1104 in FIG. 11, respectively, so the details will not be repeated herein.

Based on the embodiment shown in FIG. 12, the determining module 1003 (FIG. 10) may be configured to determine an identity of a user corresponding to the largest similarity value which is greater than a preset threshold in the comparison result as the identity of the target user. For example, in the plurality of second users, an identity of a user that has the largest similarity value, which is greater than the preset threshold, with respect to the target user is determined as the identity of the target user.

Compared with the embodiment shown in FIG. 11, in the embodiment shown in FIG. 12, index features having a small amount of data are compared first and a plurality of candidate users (for example, a plurality of first users) that may be similar to the target user are determined from the plurality of designated users so as to reduce the range to be compared. Moreover, a plurality of second users is further selected from the plurality of first users to further reduce the range to be compared; then in the further reduced range, the identity of the target user is determined through comparison of the particular feature information. In this way, the efficiency of determining the identity of the target user may be further improved.

The user identity determining apparatus 1000 (FIG. 10) may implement the user identity determining method in FIG. 1, and the details will not be repeated herein.

The above descriptions are merely example embodiments of the specification, and are not intended to limit the protection scope of the specification. Any modifications, equivalent replacements or improvements made without departing from the spirit and principle of one or more embodiments of the specification shall be encompassed in the protection scope of one or more embodiments of the specification.

The system, apparatus, modules or units illustrated in the foregoing embodiments may be implemented by a computer chip or an entity, or implemented by a product having a particular function. A typical implementation device may be a computer. For example, a personal computer, a laptop computer, a cellular phone, a camera phone, a smart phone, a personal digital assistant, a media player, a navigation device, an e-mail device, a game console, a tablet computer, a wearable device, or a combination of any of these devices.

A computer-readable medium includes non-volatile and volatile media as well as movable and non-movable media, and can implement information storage by means of any method or technology. Information may be a computer readable instruction, a data structure, and a module of a program or other data. For example, a storage medium of a computer includes, but is not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission media, and can be used to store information accessible to the computing device. The computer-readable medium does not include transitory media, such as modulated data signals and carriers.

It should be further noted that the terms "include," "comprise" or any other variations thereof are intended to cover non-exclusive inclusion, so that a process, method, article or device including a series of elements not only includes the elements, but also includes other elements not expressly listed, or further includes inherent elements of the process, method, article or device. In the absence of more limitations, an element defined by "including a/an . . . " does not exclude that the process, method, article or device including the element further has other identical elements.

The embodiments in the specification are described progressively. Identical or similar parts of the embodiments may be obtained with reference to each other. Each embodiment focuses on description of a part different from other embodiments. The apparatus embodiment is basically similar to the method embodiment, so it is described simply. For related parts, refer to the descriptions of the parts in the method embodiment.

The invention claimed is:

1. A user identity determining method, comprising:
acquiring target multidimensional feature information of a target user, wherein the target multidimensional feature information comprises at least two types of feature information in at least one of biometric feature information or non-biometric feature information;
comparing the target multidimensional feature information with multidimensional feature information of a plurality of designated users, respectively, to obtain a comparison result; and
determining an identity of the target user based on the comparison result,
wherein the comparing the target multidimensional feature information with multidimensional feature information of a plurality of designated users, respectively, to obtain a comparison result comprises:
determining a plurality of index features of the target user based on the target multidimensional feature information, wherein each of the plurality of index features of the target user is a feature uniquely identifying original feature information in the target multidimensional feature information and having a data amount less than that of the original feature information;
comparing the plurality of index features with a plurality of index features of the plurality of designated users, respectively, and determining a plurality of first users from the plurality of designated users;
comparing particular feature information in the target multidimensional feature information with particular feature information of the plurality of first users, respectively, for determining similarity values of the target user with respect to the plurality of first users; and
determining the similarity values of the target user with respect to the plurality of first users as the comparison result.

2. The method according to claim 1, wherein the comparing the target multidimensional feature information with multidimensional feature information of a plurality of designated users, respectively, to obtain a comparison result comprises:
- selecting a plurality of second users from the plurality of first users based on historical behavior data of the plurality of first users;
- comparing particular feature information in the target multidimensional feature information with particular feature information of the plurality of second users, respectively, and determining similarity values of the target user with respect to the plurality of second users; and
- determining the similarity values of the target user with respect to the plurality of second users as the comparison result.

3. The method according to claim 1, wherein the plurality of index features comprise at least one of: a single index feature for a same type of feature information, a composite index feature for at least two types of feature information occurring at a same time, or a composite index feature for feature information of different users occurring at a same time.

4. The method according to claim 1, wherein
- the biometric feature information comprises at least one of: face feature information, body feature information, gait feature information, cloth feature information, age feature information, or gender feature information; and
- the non-biometric feature information comprises at least one of: user identification (ID) information, geographical location information, or time information,
- wherein the user ID information comprises one or more of a user mobile phone number, a user identity number, and user mobile phone media access control (MAC) information.

5. The method according to claim 4, wherein when the target multidimensional feature information comprises geographical location information of the target user, the determining a plurality of index features of the target user based on the target multidimensional feature information comprises:
- determining a level 1 geographical location index feature of the target user based on the geographical location information of the target user;
- determining the level 1 geographical location index feature and a level 2 geographical location index feature of the target user based on the geographical location information of the target user; or
- determining the level 1 geographical location index feature, the level 2 geographical location index feature, and a level 3 geographical location index feature of the target user based on the geographical location information of the target user;
- wherein the level 3 geographical location index feature is a subindex of the level 2 geographical location index, and the level 2 geographical location index is a subindex of the level 1 geographical location index.

6. The method according to claim 4, wherein when the target multidimensional feature information comprises biometric feature information of the target user, the determining the plurality of index features of the target user based on the target multidimensional feature information comprises:
- performing a principal component analysis (PCA) on the biometric feature information of the target user to obtain reduced-dimensionality features of the biometric feature information;
- bucketizing the reduced-dimensionality features in a plurality of buckets representing the biometric feature information; and
- determining IDs of the plurality of buckets as the plurality of index features of the target user.

7. The method according to claim 1, wherein the determining an identity of the target user based on the comparison result comprises:
- determining an identity of a user corresponding to a largest similarity value which is greater than a preset threshold in the comparison result as the identity of the target user.

8. A user identity determining apparatus, comprising:
a processor; and
a memory configured to store instructions, wherein the processor is configured to execute the instructions to:
- acquire target multidimensional feature information of a target user, wherein the target multidimensional feature information comprises at least two types of feature information in at least one of biometric feature information or non-biometric feature information;
- compare the target multidimensional feature information with multidimensional feature information of a plurality of designated users, respectively, to obtain a comparison result; and
- determine an identity of the target user based on the comparison result,
wherein in comparing the target multidimensional feature information with multidimensional feature information of the plurality of designated users, respectively, to obtain the comparison result, the processor is further configured to execute the instructions to:
- determine a plurality of index features of the target user based on the target multidimensional feature information, wherein each of the plurality of index features of the target user is a feature uniquely identifying original feature information in the target multidimensional feature information and having a data amount less than that of the original feature information;
- compare the plurality of index features with a plurality of index features of the plurality of designated users, respectively, and determine a plurality of first users from the plurality of designated users;
- compare particular feature information in the target multidimensional feature information with particular feature information of the plurality of first users, respectively, for determining similarity values of the target user with respect to the plurality of first users; and
- determine the similarity values of the target user with respect to the plurality of first users as the comparison result.

9. The apparatus according to claim 8, wherein the processor is further configured to execute the instructions to:
- select a plurality of second users from the plurality of first users based on historical behavior data of the plurality of first users;
- compare particular feature information in the target multidimensional feature information with particular feature information of the plurality of second users, respectively, and determine similarity values of the target user with respect to the plurality of second users; and
- determine the similarity values of the target user with respect to the plurality of second users as the comparison result.

10. The apparatus according to claim 8, wherein the plurality of index features further comprise at least one of:

a single index feature for a same type of feature information, a composite index feature for at least two types of feature information occurring at a same time, or a composite index feature for feature information of different users occurring at a same time.

11. A non-transitory computer-readable storage medium storing one or more instructions that, when executed by a processor of an electronic device, cause the electronic device to perform:
acquiring target multidimensional feature information of a target user, wherein the target multidimensional feature information comprises at least two types of feature information in at least one of biometric feature information or non-biometric feature information;
comparing the target multidimensional feature information with multidimensional feature information of a plurality of designated users, respectively, to obtain a comparison result; and
determining an identity of the target user based on the comparison result,
wherein the comparing the target multidimensional feature information with multidimensional feature information of a plurality of designated users, respectively, to obtain a comparison result comprises:
determining a plurality of index features of the target user based on the target multidimensional feature information, wherein each of the plurality of index features of the target user is a feature uniquely identifying original feature information in the target multidimensional feature information and having a data amount less than that of the original feature information;
comparing the plurality of index features with a plurality of index features of the plurality of designated users, respectively, and determining a plurality of first users from the plurality of designated users;
comparing particular feature information in the target multidimensional feature information with particular feature information of the plurality of first users, respectively, for determining similarity values of the target user with respect to the plurality of first users; and
determining the similarity values of the target user with respect to the plurality of first users as the comparison result.

12. The non-transitory computer-readable storage medium according to claim 11, wherein the one or more instructions further cause the electronic device to perform:
selecting a plurality of second users from the plurality of first users based on historical behavior data of the plurality of first users;
comparing particular feature information in the target multidimensional feature information with particular feature information of the plurality of second users, respectively, and determining similarity values of the target user with respect to the plurality of second users; and
determining the similarity values of the target user with respect to the plurality of second users as the comparison result.

13. The non-transitory computer-readable storage medium according to claim 11, wherein the plurality of index features comprise at least one of: a single index feature for a same type of feature information, a composite index feature for at least two types of feature information occurring at a same time, or a composite index feature for feature information of different users occurring at a same time.

* * * * *